United States Patent [19]

Chak

[11] Patent Number: 4,839,498
[45] Date of Patent: Jun. 13, 1989

[54] ELECTRICALLY HEATED FISH TANK UNIT

[76] Inventor: Maryan Chak, 2901 Ocean Pkwy., Apt. C-4, Brooklyn, N.Y. 11235

[21] Appl. No.: 161,718

[22] Filed: Feb. 29, 1988

[51] Int. Cl.[4] .......................... H05B 1/02; H05B 3/00; H01K 63/00
[52] U.S. Cl. ........................................ 219/311; 119/5; 219/433; 219/528; 219/535
[58] Field of Search .................................. 219/310–312, 219/535, 528, 523, 345, 358, 432, 433; 119/5

[56] References Cited

U.S. PATENT DOCUMENTS

| | | | |
|---|---|---|---|
| 2,002,380 | 5/1935 | Wernicke et al. | 119/5 |
| 2,706,768 | 4/1955 | Kaplan | 219/528 X |
| 2,805,313 | 9/1957 | Lumb | 219/311 |
| 3,041,441 | 6/1962 | Elbert et al. | 219/358 |
| 3,059,091 | 10/1962 | Wenzel | 219/523 X |
| 3,842,241 | 10/1974 | Isaacson et al. | 219/311 |
| 3,890,486 | 6/1975 | Fitzgerald | 119/5 |
| 4,313,048 | 1/1982 | Holbrook | 219/311 |

FOREIGN PATENT DOCUMENTS

| | | | |
|---|---|---|---|
| 18655 | 11/1980 | European Pat. Off. | 119/5 |
| 2283618 | 3/1976 | France | 219/311 |
| 7607865 | 1/1977 | Netherlands | 119/5 |
| 1347702 | 2/1974 | United Kingdom | 219/311 |
| 2156191 | 10/1985 | United Kingdom | 219/311 |

Primary Examiner—Anthony Bartis
Attorney, Agent, or Firm—Ilya Zborovsky

[57] ABSTRACT

An electrically heated fish tank unit includes a fish tank having a bottom standing on a frame having an upper surface with a central opening. A one piece flat electric heater disposed between the bottom of the tank and the frame includes a thermostatically controlled central resistance heating element abutting the bottom of the tank from below and surrounded by a peripheral portion devoid of the heating element and clamped between the bottom of the tank and the frame. The surface of the heater abutting the tank may be decorative so as to be visible through the tank wall, while the opposite surface is covered by thermal insulation to prevent heat dissipation away from the tank. An indicator light and thermometer may be provided to indicate the operation of the heater and temperature of the tank.

7 Claims, 3 Drawing Sheets

ELECTRICALLY HEATED FISH TANK UNIT

BACKGROUND OF THE INVENTION

The present invention relates to an electrically heated fish tank unit.

Heated fish tanks of the above mentioned general type are known in the art. One of the known heated fish tanks includes a heating device with a heater which is insertable into the interior of the fish tank to heat up water in the fish tank. This device possesses some disadvantages. The device must be electrically isolated from water in the tank, which increase its cost and energy consumption. In the event of breakage of the device inside the fish tank, the tank population inevitably perishes. The device is not convenient in use.

SUMMARY OF THE INVENTION

Accordingly, it is an object of the present invention to provide a heated fish tank unit, which avoids the disadvantages of the prior art, as well as a method of heating.

In keeping with these objects and with others which will become apparent hereinafter, one feature of the present invention resides, briefly stated, in a heated fish tank unit which has a support with a central opening and a heater with a heating element abutting against the bottom of a fish tank from below in the region of the central opening and having a peripheral portion devoid of the heating element and clamped between the bottom of the fish tank and the support.

The novel features of the present invention are set forth in particular in the appended claims. The invention itself, however, both as to its construction and its method of operation will be best understood from the following description of preferred embodiment accompanied by the following drawing.

DESCRIPTION OF PREFERRED EMBODIMENTS

A heated tank unit in accordance with the present invention has a fish tank 1 which stands on a frame 2.

Figure 1:
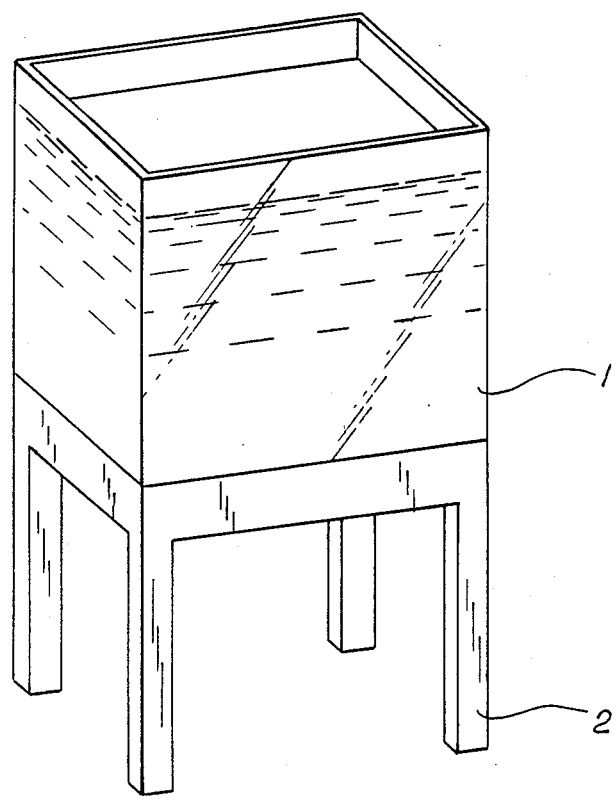
FIG. 1 is a perspective view of a heated fish tank unit in accordance with the present invention.
Figure 2:
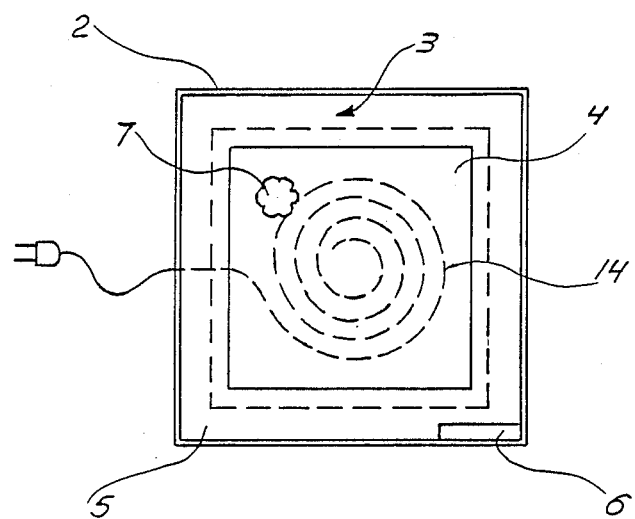
FIG. 2 is a plan view of the invention heater for heating the fish tank.
Figure 3:
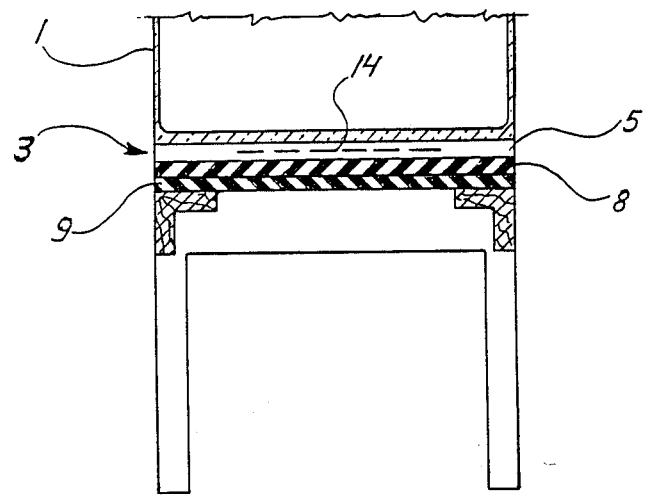
FIG. 3 is a cross section of the heated fish tank unit.
Figure 4:
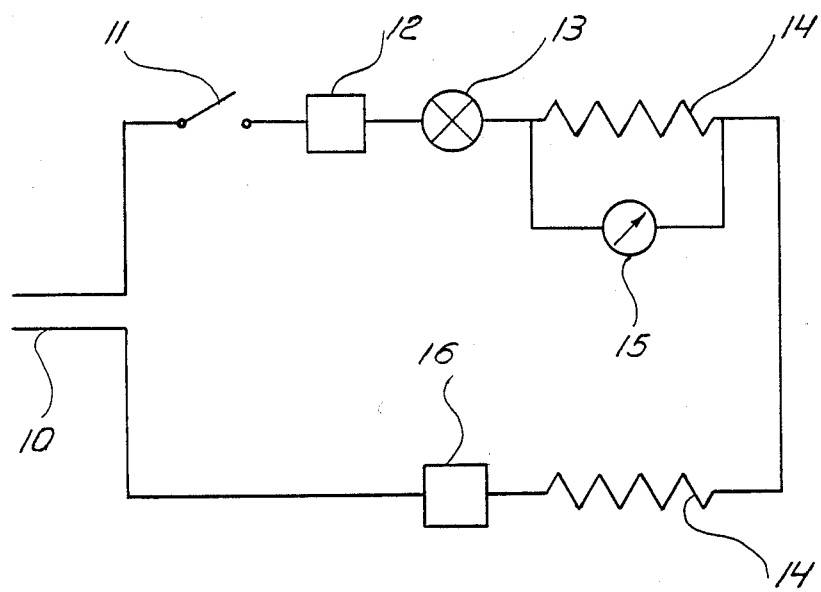
FIG. 4 is an electrical diagram of the inventive heating device.
Figure 5:
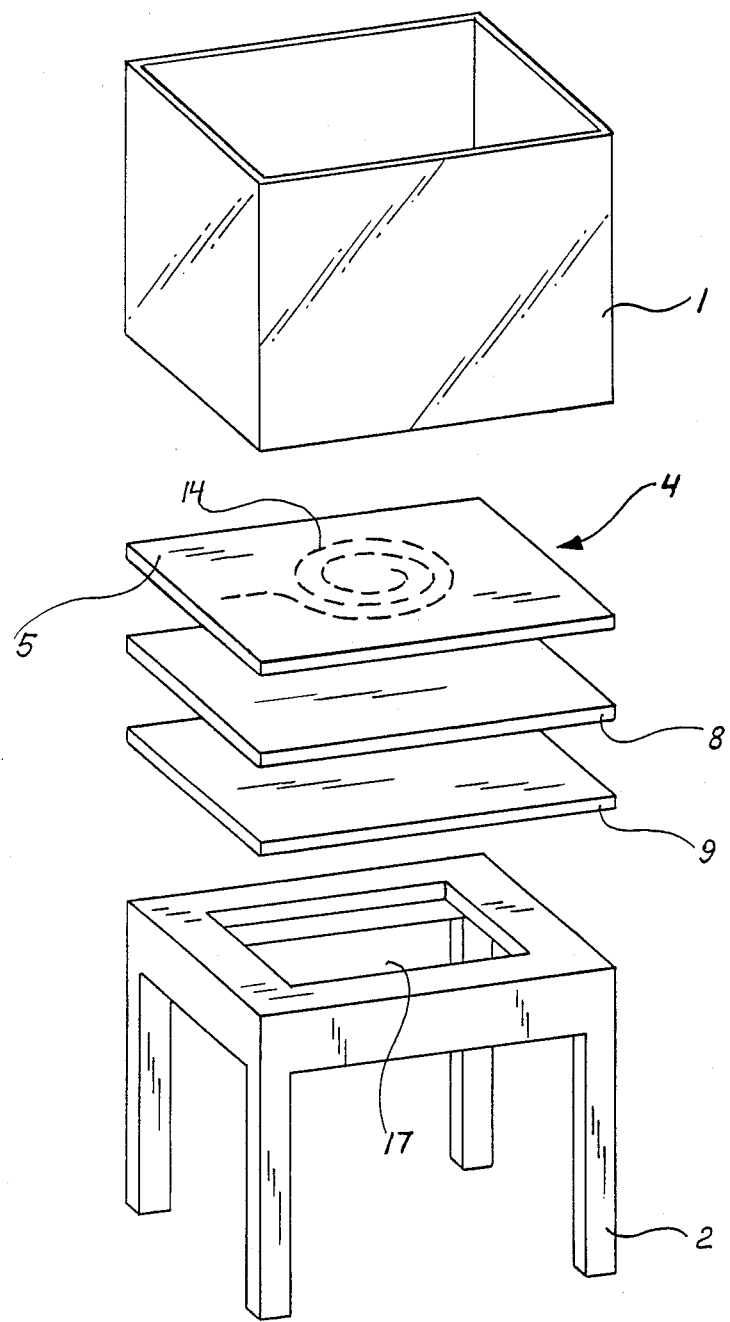
FIG. 5 is an exploded perspective view of the inventive heated fish tank unit.

A heating device is identified as a whole with reference numeral 3. It includes a heater 4 which includes an electrical resistance element 14 as shown in broken lines in FIG. 2, for example, of a spiral shape, and accommodated in a casing, for example, of fabric. As can be seen from FIG. 2, the heater 4 is located under a bottom of a fish tank and occupies almost the whole lower surface of the bottom inside the contour of the frame 2.

The heater 4 is provided with a peripheral portion 5 which extends around the heating element over its whole outer contour. The peripheral portion is of one piece with the casing of the heater, but does not contain the heating element shown in broken lines. The peripheral portion 5 extends over the frame 2 and in working position is clamped between the bottom of the fish tank 1 and the upper surface of the frame 2, to firmly hold the heater in abutment with flat contact against the lower surface of the bottom of the fish tank, to provide maximum transfer of heat from the heating element 14 through the bottom to the interior of the fish tank. As can be seen from the drawings, the heating element 14 of the heater 4 is located in the region of an opening 17 in the upper region of the frame 2, while the peripheral portion 5 which does not have the heating element is clamped between the bottom of the fish tank and the frame.

The heater 4 can be also placed against another wall, for example side wall of the fish tank. For this purpose it can be provided with attaching means, for example, a piece of Velcro 6 attached to the surface of the heater and engageable with another piece of Velcro attached to the respective wall of the fish tank.

Decorative means can be provided on the surface of the heater, which faces toward the interior of the fish tank. Such decorative means 7 is visible through the transparent walls of the fish tank and improve its attractiveness. The decorative means can be pictures, letters, scenes, etc.

For preventing dissipation of heat from the heater and directing the heat only toward the fish tank, heat insulating means can be provided at the side of the heating element which is opposite to the side facing the fish tank. Such heat insulating means can include, for example, a layer of asbestos 8 and an additional layer of glass fibers or glass wool 9.

The heating element 14 is electrically connectable with a source of electric current through a conductor 10. The electrical circuit for the heating element includes an on-off switch 11, a protection fuse 12, a light bulb for indicating the operation of the device, a thermometer 15 to show the temperature of the heating element, and a thermostat 16 for regulating the temperature of the heater.

The device in accordance with the present invention is simple, reliable and efficiently heats water in the fish tank from outside of the latter.

The invention is not limited to the details shown since various modifications and structural changes are possible without departing in any way from the spirit of the invention.

What is desired to be protected by Letters Patent is set forth in particular in the appended claims.

I claim:

1. A heated fish tank unit, comprising
   a frame having an upper surface with a central opening;
   a fish tank having a bottom and standing with said bottom on said upper surface of said frame; and a one piece flat heater placed under said bottom of said fish tank and having two opposite sides such that one of said sides is placed against said bottom of said fish tank from below so as to heat water in said fish tank through its bottom, said flat heater having a predetermined outer contour and a centrally located resistance heating element, said one piece flat member further including a peripheral portion devoid of said heating element which extends along said contour of said heater so that when said fish tank is installed on said upper surface of said frame said peripheral portion is held between said bottom of said fish tank and said upper surface of said frame while said heating element is located inwardly of said opening of said frame in heat transfer relation to said bottom of said fish tank.

2. A heated fish tank unit as defined in claim 1; and further comprising a flat heat insulating member placed against another side of ssid flat heater in flat contact therewith, so as to prevent dissipation of heat from said other side and to direct-heat transmission to said one side of said heater.

3. A heated fish tank unit as defined in claim 1; and further comprising means for regulating temperature of said heating element and including a thermostat in series therewith.

4. A heated fish tank unit as defined in claim 1; and further comprising means for signalling operation of said heating element and including a light indicator in series therewith.

5. A heated fish tank unit as defined in claim 1; and further comprising decorative means provided on said one side of said heater so as to be visible through said bottom of said fish tank.

6. A heated fish tank unit as defined in claim 1; and further comprising means for attaching said heater to said bottom of said fish tank and including an attaching member arranged between said one side of said heater and said bottom.

7. A heated fish tank unit as defined in claim 6, wherein said attaching member is connected with said one side of said heater and has a surface connected to said bottom of said fish tank.

* * * * *